O. C. ORDWAY.
WAGON BRAKE.
No. 245,860.                    Patented Aug. 16, 1881.
Fig. 1.
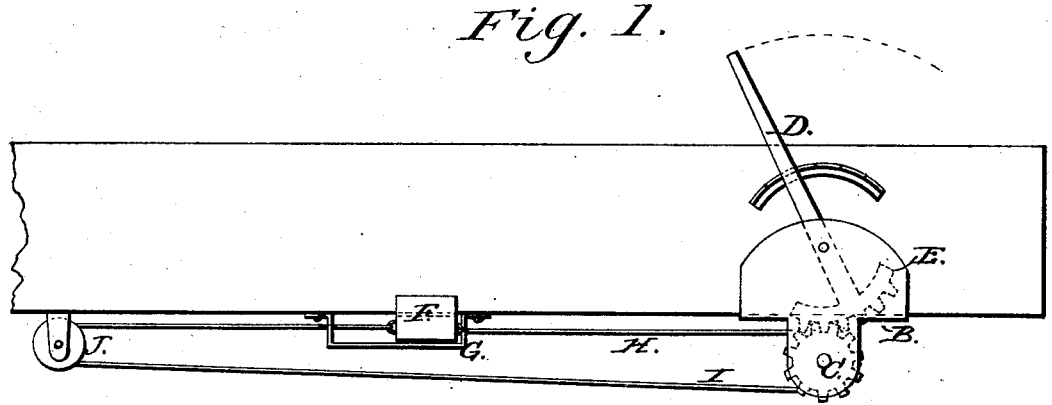
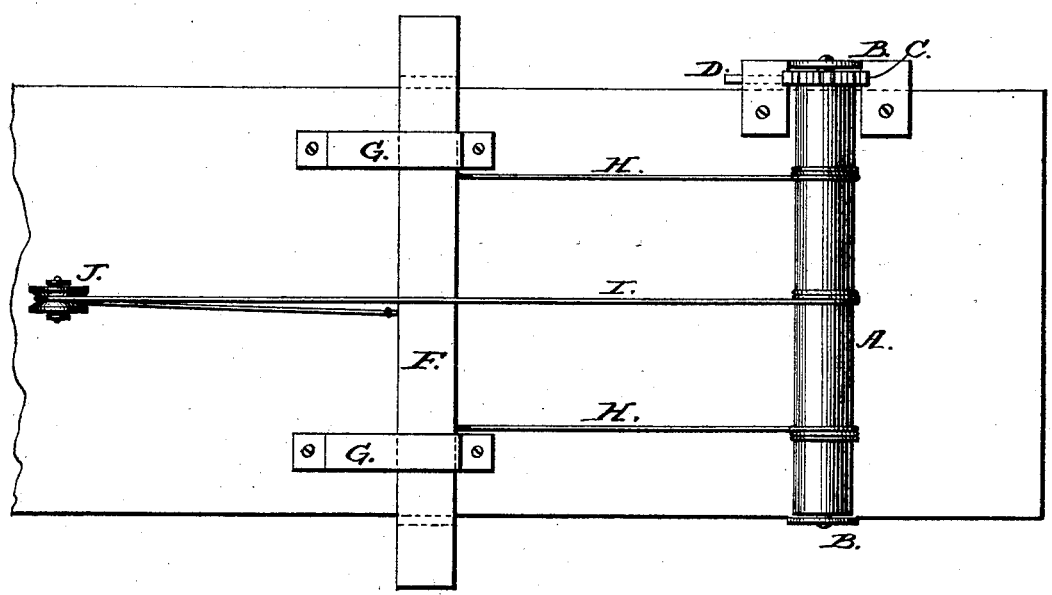
Fig. 2.
Witnesses:                       Inventor:
L. H. Ordway                     Oscar Charles Ordway
F. M. Ordway

UNITED STATES PATENT OFFICE.

OSCAR C. ORDWAY, OF LONDON, KANSAS.

WAGON-BRAKE.

SPECIFICATION forming part of Letters Patent No. 245,860, dated August 16, 1881.

Application filed February 17, 1880.

*To all whom it may concern:*

Be it known that I, OSCAR C. ORDWAY, a citizen of the United States, residing at London, in the county of Sumner and State of Kansas, have invented certain new and useful Improvements in Wagon-Brakes; and I do hereby declare that the following is a full, clear, and exact description thereof, reference being had to the accompanying drawings, and to the letters of reference marked thereon, which form a part of this specification.

My invention has for its object to provide an improved brake for wagons and other vehicles; and it consists, essentially, of a cylindrical roller journaled in fixed bearings on each side of the wagon-body, and provided upon one end with a cog-wheel, which is adapted for operation in connection with the cogs on the lower curved end of the pivoted brake-handle, to operate a cross-bar for blocking the wheels, all as will be hereinafter more fully described, and pointed out in the claim.

In the drawings, Figure 1 is a side elevation of a wagon-body with my improvements attached thereto, and Fig. 2 is a bottom-plan view of the same.

Similar letters of reference indicate like parts in both figures.

Referring to the drawings, A represents a cylindrical roller extending across the bottom of the wagon-body from side to side, and journaled in the fixed bearings B, attached to the sides of the body, one end of said roller A being provided with a cog-wheel, C, as shown. D represents the brake-handle, which is pivoted to the side of the wagon-body, and provided at its lower end with a segment, E, having teeth or cogs which engage with the cog-wheel C of the roller A.

At the center of the body of the wagon is provided a cross-bar, F, which acts as the brake-blocks, the outer ends bearing against the wheels on each side when in operation, said bar being adapted to slide in bearings G on the under part of the body of the wagon, as fully shown in Fig. 2. This bar F is drawn forward in one direction by means of the ropes or chains H H, secured to said bar at one end and wound around the roller A at the other end, and is drawn backward to lock the wheels by the single chain or rope I, which is wound around the roller A at one end in a contrary direction to the wind of the ropes or chains H H, and, passing back to the rear of the wagon-body and over the pulley J, is secured to the rear of the bar F, as shown in Fig. 2.

In the operation of my invention it will be observed that by depressing or raising the handle D the roller A is caused to revolve in either direction, thereby bringing the bar F against the wheels or releasing it therefrom, as the case may be, the operation of the roller being such that when winding up the chains or ropes H H, the single chain or rope I is being unwound, and vice versa, thereby doing away with the necessity of a spring to release the bar F from its engagement with the wheels.

I am aware of the patent granted to David Philips under date of July 14, 1868, and numbered 79,855, and do not therefore desire to claim the construction shown therein, either separately or in combination; but,

Having thus described my invention, what I claim as new and useful is—

In a wagon-brake, the cylindrical roller A, journaled in the bearings B, and provided with the cog-wheel C, in combination with the pivoted handle D, having segment E, the cogs of which engage with the cog-wheel C on roller A, to operate the bar F by means of the chains or ropes H H and I, substantially as specified.

OSCAR CHARLES ORDWAY.

Witnesses:
EDGAR NEWELL ORDWAY,
SAMUEL J. KIRKWOOD, Jr.